May 27, 1924.
W. L. PUCKETT, SR
1,495,797
TRANSMISSION BELT JOINT
Filed Dec. 1, 1922
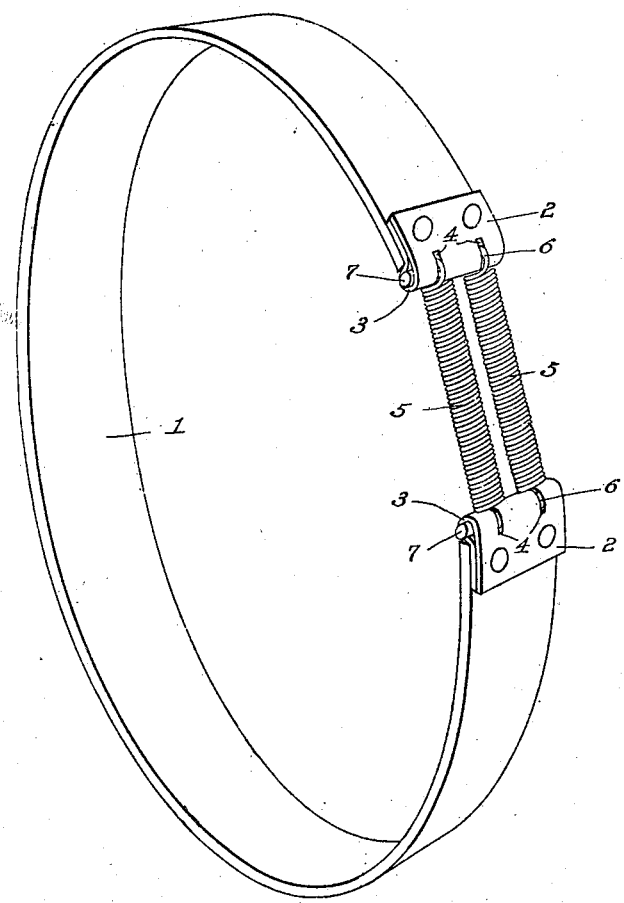
*Inventor;*
*William L. Puckett Sr.,*
per A. J. Martell
*Attorney.*

Patented May 27, 1924.

1,495,797

UNITED STATES PATENT OFFICE.

WILLIAM L. PUCKETT, SR., OF LOS ANGELES, CALIFORNIA.

TRANSMISSION-BELT JOINT.

Application filed December 1, 1922. Serial No. 604,177.

*To all whom it may concern:*

Be it known that I, WILLIAM L. PUCKETT, Sr., a citizen of the United States, residing at Los Angeles, in the county of Los Angeles and State of California, have invented new and useful Improvements in Transmission-Belt Joints, of which the following is a specification.

My invention relates to transmission belts and has for its object to provide continuous means for compensating the progressive stretch of the belt material, so as to maintain a substantially constant tension of the belt during its life.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

My objects are attained by the device illustrated in the accompanying drawing, which is a perspective view of an automobile fan belt embodying my improved construction.

The belt 1 is cut considerably shorter than the length required to embrace the transmission pulleys, and on each end is riveted a special hinge clip 2. These clips are formed substantially as shown, with transverse loops 3, and longitudinal kerfs 4 cutting across the loops.

The clips are connected together by a plurality of close wound helical tension springs 5, of which two are used in the case illustrated; the springs are formed with loops 6 at each end, and these loops are adapted to fit into the kerfs 4. The assembly of the device is completed by passing rawhide thongs 7 through the loops of the clips and springs.

The length of the completed belt as illustrated is also shorter than the theoretical length required, so that springs 5 have to be extended when the belt is applied. Thereafter these springs serve to apply tension to the belt and to maintain the tension as the material 1 stretches in service.

The diameter of the springs, in relation to the other cooperating parts, should be such that their inner peripheries come substantially flush with the inner surface of belt material 1. In this manner they will contact with the pulley surfaces and fluctuation of the transmitted power, due to the gap in material 1, will be avoided.

The thongs 7, serving as hinge pins, make the construction very flexible, and owing to the inherent qualities of the rawhide of which they are composed, they are self lubricating.

I claim as my invention:

1. A transmission belt joint comprising transversely looped clips attached to the respective ends of said belt; kerfs intersecting said loop; a plurality of helical tension springs with looped ends engaging said kerfs; and pins of rawhide, passed through the respective loops in said clips and said springs to constitute hinged joints therebetween.

2. A transmission belt joint comprising transversely looped clips attached to the respective ends of said belt, said clips being provided with kerfs in their looped portions, a plurality of helical tension springs with looped ends, engaging said kerfs, and pins passed through the looped portions of said clips and the looped ends of said springs to constitute hinged joints therebetween.

WILLIAM L. PUCKETT, SR.